United States Patent [19]
Shimoichi et al.

[11] Patent Number: 5,342,161
[45] Date of Patent: Aug. 30, 1994

[54] HOLDER CHANGER

[75] Inventors: Kouji Shimoichi; Hideyuki Furumoto, both of Hiroshima, Japan

[73] Assignee: Hirotec Corporation, Hiroshima, Japan

[21] Appl. No.: 969,457

[22] Filed: Oct. 30, 1992

[30] Foreign Application Priority Data

Apr. 14, 1992 [JP] Japan ................. 4-31981[U]

[51] Int. Cl.[5] ................. B25J 15/00; B21D 37/04
[52] U.S. Cl. ..................... 414/416; 483/60; 483/55; 414/595
[58] Field of Search ........... 414/222, 254, 277, 331, 414/281, 282, 736, 595, 609, 416; 100/218; 187/12; 901/6, 7, 29, 41; 483/60, 61, 54, 55, 56, 57

[56] References Cited

U.S. PATENT DOCUMENTS

| | | | |
|---|---|---|---|
| 4,648,786 | 3/1987 | Sakurai | 414/736 X |
| 4,923,054 | 5/1990 | Ohtani et al. | 414/609 X |
| 4,948,329 | 8/1990 | Fuse et al. | 901/7 X |
| 5,049,022 | 9/1991 | Wilson | 414/254 X |

FOREIGN PATENT DOCUMENTS

| | | |
|---|---|---|
| 357519 | 3/1991 | Japan . |
| 3248762 | 11/1991 | Japan . |
| 3126233 | 12/1991 | Japan . |

*Primary Examiner*—David A. Bucci
*Assistant Examiner*—James T. Eller, Jr.
*Attorney, Agent, or Firm*—Longacre & White

[57] ABSTRACT

A holder changer includes a robot fixed to front or rear faces of a press, and an oblique elevator which obliquely moves a plurality of holders to a work moving level from a lower level in a direction crossing a work moving direction. A fixing portion at an end of the robot is adapted to removably hold and transport the holders for changing the holders.

9 Claims, 6 Drawing Sheets

HOLDER CHANGER

BACKGROUND OF THE INVENTION

1. Field of the Invention

The present invention relates to a holder changer, and in particular to a holder changer for automatically changing holders, which are used to transport materials or works to a press and to transport the machined works from the press, in accordance with types of the materials and configurations of the works.

2. Description of the Background Art

In tandem presses, holders of transportation robots have been changed each time the specification for the work is to be changed. This changing operation is carried out by an operator, who enters a central section of a transporter, and the press is stopped during this operation. Therefore, in the press industries which have been required to comply with production of various types but small number of products in recent years, a frequency of change of the holders of robots necessarily increases, which increases the stop time period of the presses, resulting in reduction of the press productivity. Further, since the change of the holders is manually carried out, sufficient measures for achieving the safety of the operator must be applied to the press and peripheral equipments, resulting in increase of the expenses for the equipments and persons.

An object of the invention is to provide a holder changer capable of automatic changing of holders used for transporting materials and works in a press operation.

Another object of the invention is to provide a holder changer which requires a press to be stopped only for an extremely short time period, allows an operator to stay at a safe position remote from a central section of a transporter, and enables change of holders without stopping a press line, e.g., conveyor.

SUMMARY OF THE INVENTION

The present invention provides a holder changer including a robot fixed to front or rear faces of a press, and an oblique elevator which obliquely moves a box for bearing a plurality of holders to a work moving level from a lower level in a direction crossing a work moving direction, wherein a fixing portion at an end of the robot is adapted to removably hold and transport the holders for changing the holders.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENT

Figure 1:
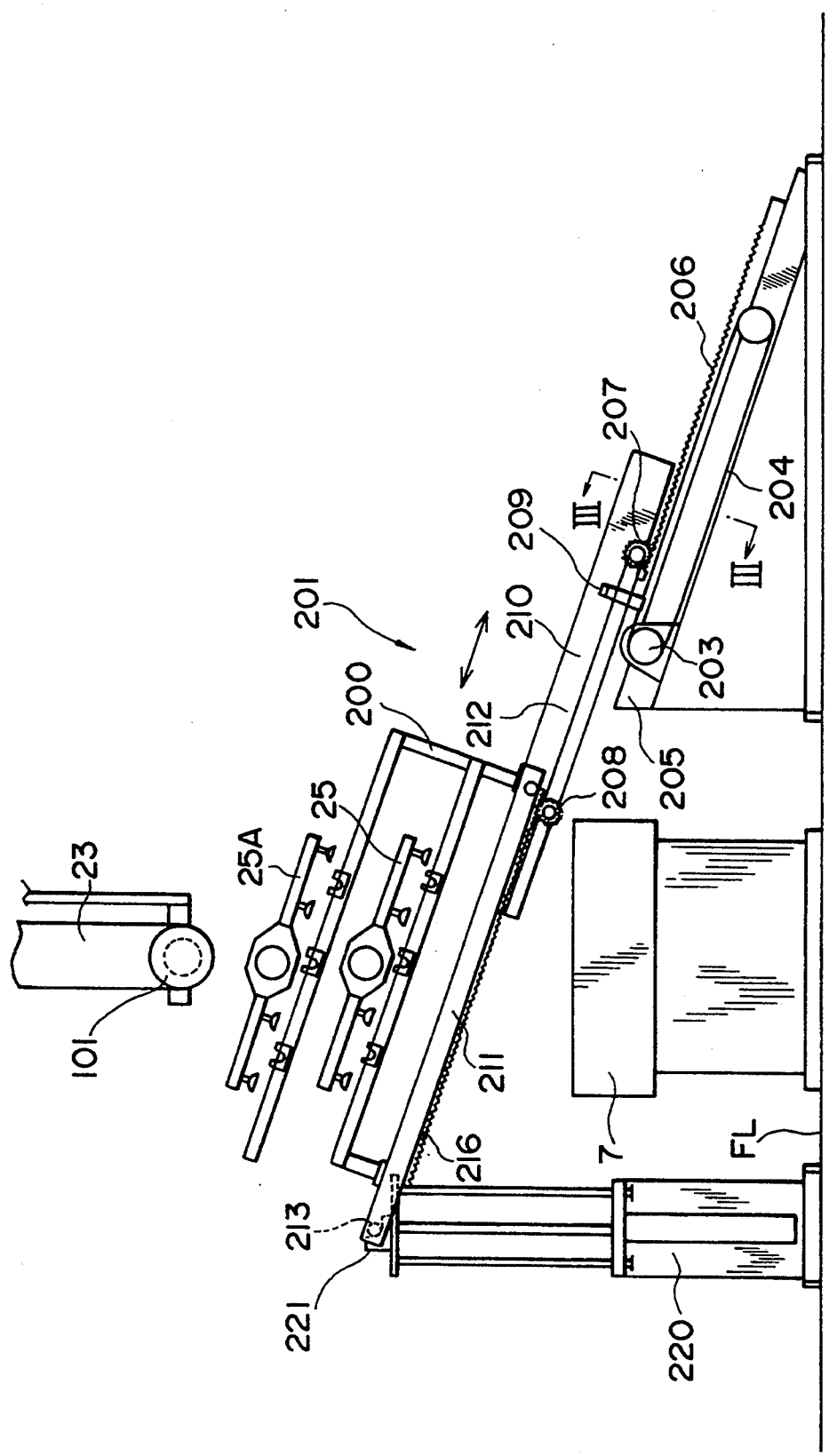
FIG. 1 is a cross section taken along line I—I in FIG. 6, showing a condition in which a holder changer according to the invention is extended for a changing operation.
Figure 2:
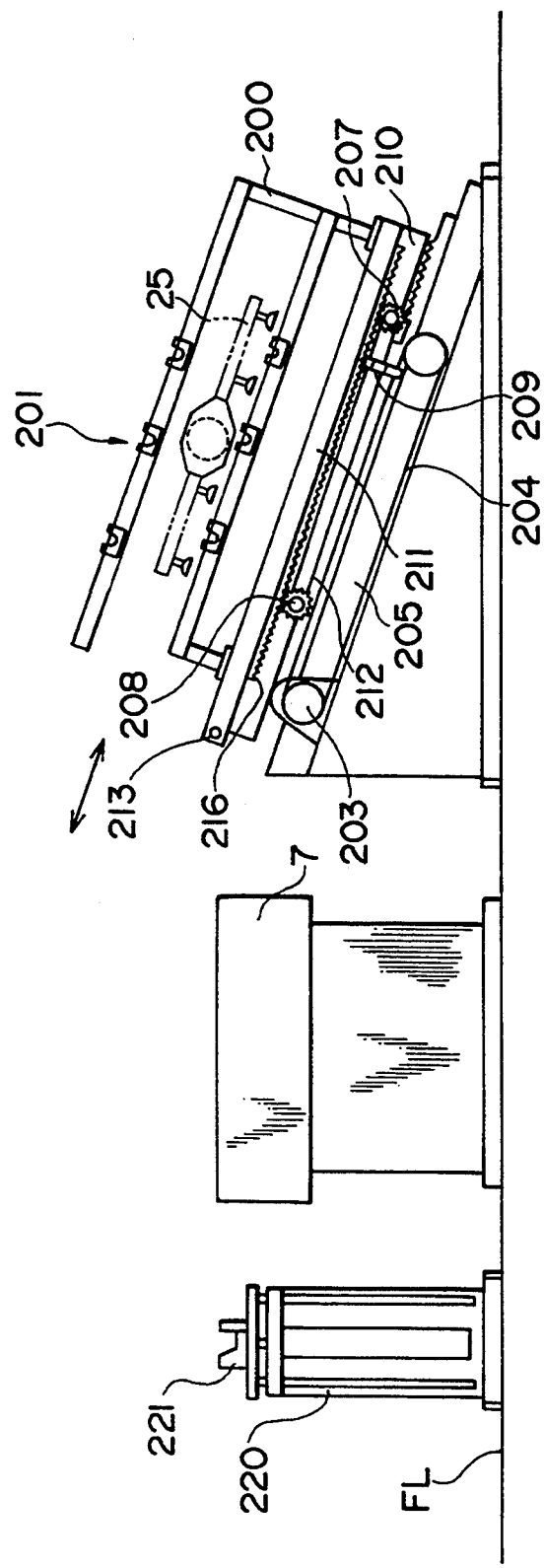
FIG. 2 is a cross section taken along line I—I in FIG. 6, showing a standby state of a holder changer according to the invention prior to a changing operation.
Figure 3:
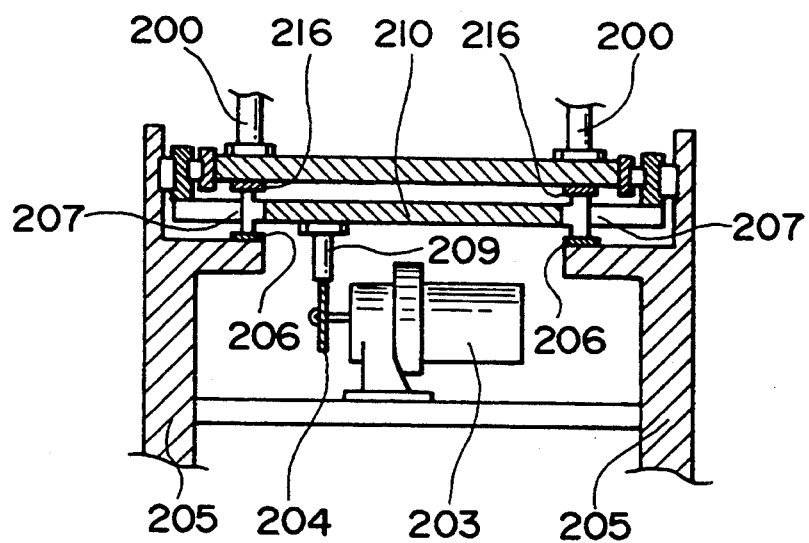
FIG. 3 is a cross section taken along line III—III in FIG. 1.
Figure 4:
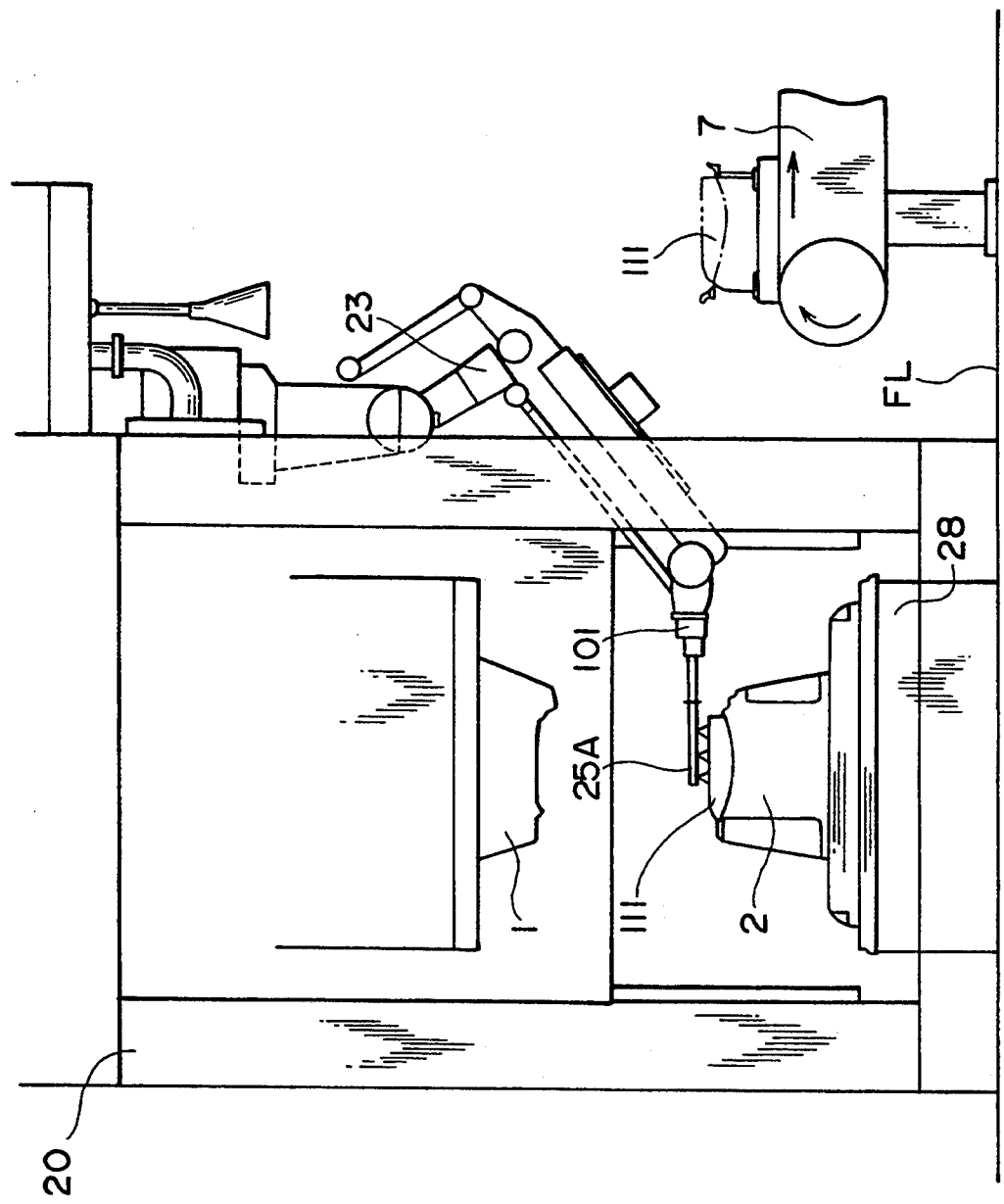
FIG. 4 is a cross section taken along line IV—IV in FIG. 6.
Figure 5:
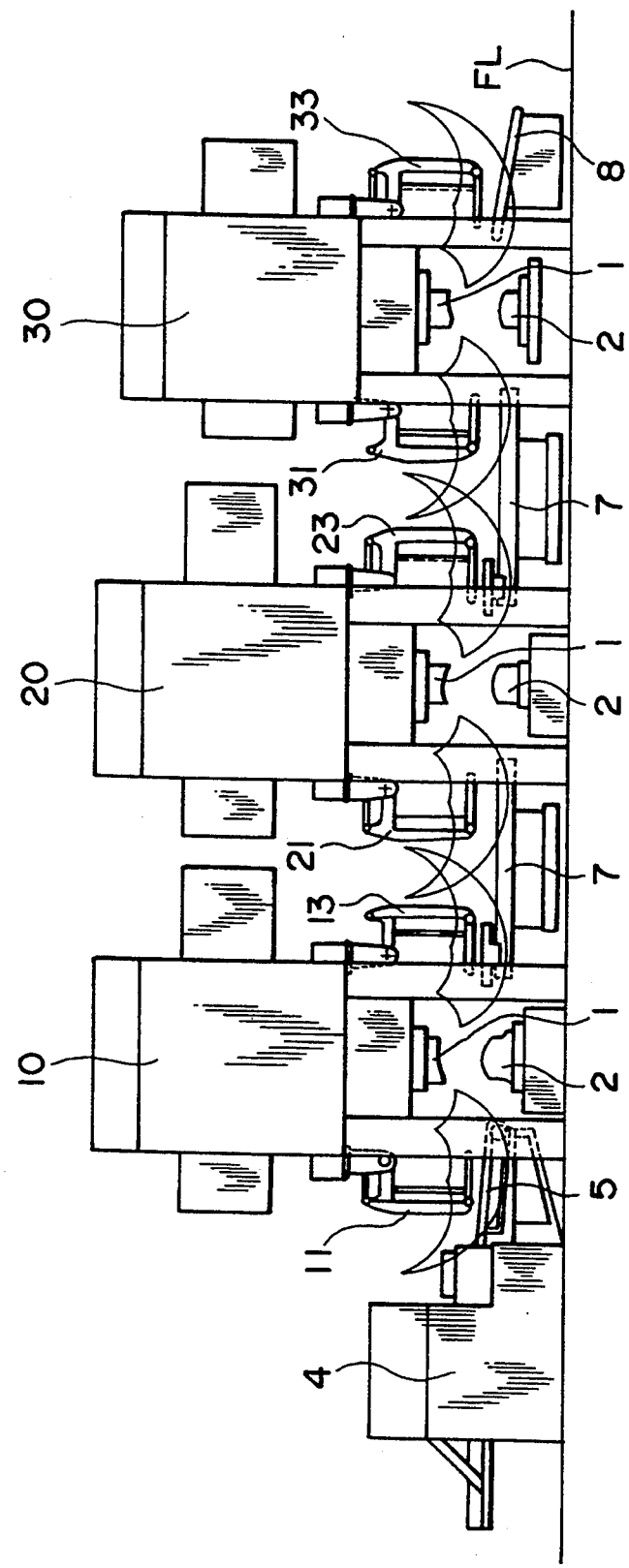
FIG. 5 is a side view of a whole layout shown in FIG. 6.
Figure 6:
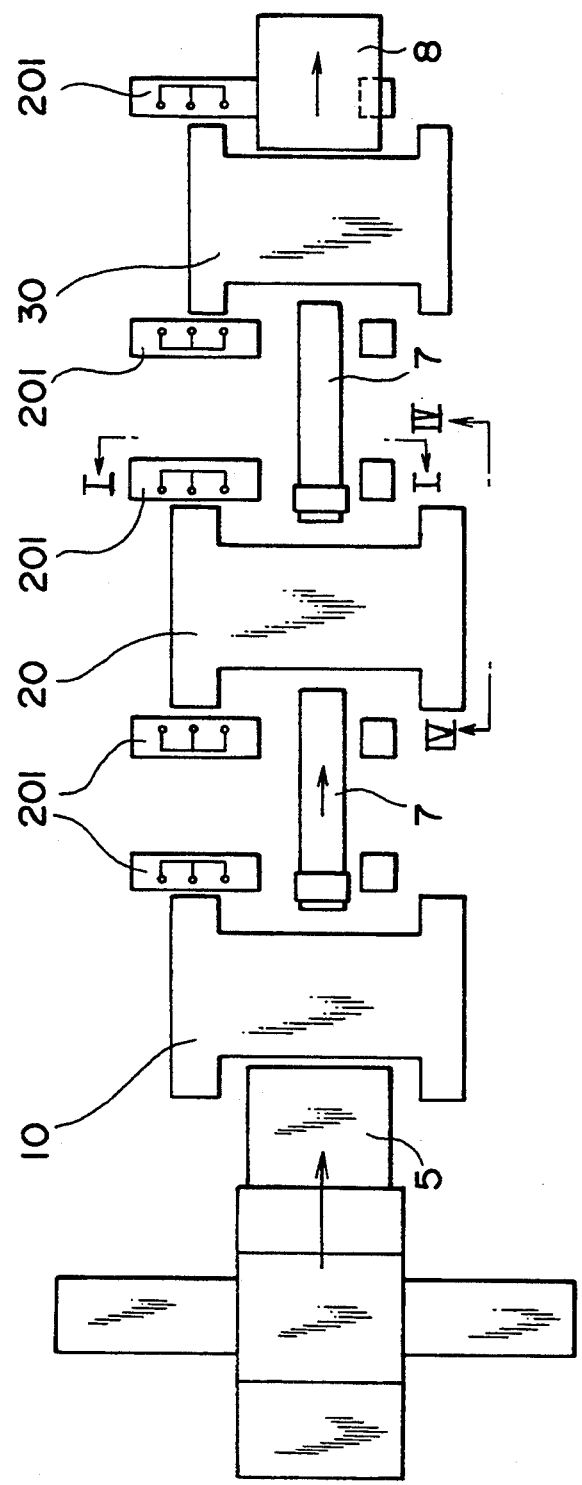
FIG. 6 is a plan view showing a whole layout of an embodiment of the invention.

FIG. 6 shows a layout of an embodiment of the invention, in which presses indicated by reference numerals 10, 20 and 30 are disposed in tandem with conveyors 7 therebetween. At numerals "201" are indicated oblique elevators, which are holder changers according to the invention. "5" and "8" indicate feed and discharge conveyors, respectively. FIG. 5 is a side view, in which "11" and "13" indicate robots fixed at front and rear faces of the press 10, respectively. "21" and "23" indicate robots fixed at front and rear faces of the press 20, respectively. "31" and "33" indicate robots fixed at front and rear faces of the press 30, respectively. Further, "1" indicates an upper die of a press die set provided at each press, and "2" indicates a lower die of the press die set. "4" indicates a material stack. For example, when the press is operating, a first movable base 210 of an oblique elevator 201 as well as a second movable base 211 to which a box 200 is fixed are located at a right position, i.e., standby position, as shown in FIG. 2, and an operator loads a holder 25 on a lower deck of the box 200. After the robot 23 transported a work 111 from the press 20 onto the conveyor 7, as shown in FIG. 4, and the conveyor 7 transported the work 111, a geared motor 203 (see FIG. 3) is turned on, whereby the first and second movable bases 210 and 211 extend leftward to the position shown in FIG. 1. Simultaneously, a support elevator 220 rises to a position in which a connector 221 at the end of the elevator 220 is connected to a connector 213 at the end of the second movable base, whereby the movable bases 210 and 211 in a cantilever form are firmly supported by a support elevator 220.

Now, description will be made on a mechanism and an operation for moving the first and second movable bases from the standby position in FIG. 2 to the extended position in FIG. 1 and for returning the first and second movable bases from the extended position to the standby position. In FIG. 1, a rack 206 is fixed to the upper surface of an inclined base 205. A first pinion 207 rotatably supported by the first movable base 210 is in engagement with the rack 206. A rotary force of a rotary shaft, to which the first pinion 207 is fixed, is transmitted through a pulley and a toothed belt 212 to a second pinion 208. The second pinion 208 is rotatably supported at an upper left portion of the first movable base 210, and is in engagement with a rack 216 fixed at the lower portion of the second movable base 211. Therefore, when the geared motor 203 drives its pulley counterclockwise, a connector 209 fixed to a chain 204 moves leftward and upward to move the first movable base 210 in the same direction. As a result, the first pinion 207 is driven, and the rotary force thereof is transmitted to the second pinion 208, whereby the second movable base 211 is moved leftward and upward at the same speed as the first movable base. Therefore, the speed at which the second movable base 211 moves with respect to the ground is twice as large as the speed at which the first movable base 210 moves with respect to the ground. Accordingly, the holder 25 on the box 200 moves from the standby position to the change position (extended position) at the double speed owing to the double deck structure, and thus the time period required for changing the holders is reduced. Further, in the standby state, the structures are retracted to be compact, so that an area occupied by the installation can be small. The movement from the position in FIG. 1 to the position in FIG. 2 is carried out in the opposite manner.

The second holder 25 to be changed is loaded on the lower deck of the box 200 when the box 200 is in the standby position in FIG. 2. Then, the first and second movable bases 210 and 211 extend to the position in FIG. 1, and the robot transports the used first holder 25A onto the upper deck of the box 200 and leaves the first holder 25A.

Then, a pneumatic fixing portion 101 of the robot 23 firmly holds the second holder 25, and temporally maintains the second holder 25 at a position above the box. Then, the first and second movable bases return to the standby position, and the support elevator also lowers to the position shown in FIG. 2. Thereafter, the robot in the temporarily stopped state is reactivated to start the second work transporting operation. During the pressing operation, the operator loads and unloads different tools in and from the box, if necessary, which is located at the standby position remote from the central section of the transporter. The robot, conveyor and oblique elevator are controlled by a controller(s) installed around the main body of the press.

Electrical interlock is provided between the operations of the robot 23 and the oblique elevator 201 to prevent the mutual interference. These operations are controlled in accordance with a program sequence which has been prepared in advance.

The holders in the illustrated embodiment may be vacuum holders each provided with many suction cups, and also may be other types of fingers.

The present invention can achieve all the objects described before. Specifically, in a preparatory operation which can be done during the operation of the press, the new holder may be loaded in the supply box, whereby the holders may be automatically changed when the press working is completed, so that the operation rate of the press is improved. Also, the safety for the operator is improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A holder changer apparatus for changing a holder means for transporting raw works to a press and for removing machined works from said press, said apparatus comprising:
    an elevator means adjacent to said press for delivering a plurality of said holder means from a standby position remote from said press to an extended and elevated position proximate said press;
    robot means mounted on said press for selectively receiving at least one of said plurality of said holder means from said elevator means;
    a fixing portion provided on said robot means, for removably carrying said holder means.

2. The holder changer apparatus according to claim 1, further comprising a conveyor means for conveying said raw works and said machined works in a work moving direction, wherein said elevator means obliquely moves with respect to said work moving direction from said standby position at a lower level to said extended position at a work moving level.

3. The holder changer apparatus according to claim 1, wherein said elevator means comprises first and second movable bases and a box means for containing said holder means, said first and second movable bases adapted to move in a telescoping manner from said standby position to said extended position.

4. The holder changer apparatus according to claim 3, wherein said first movable base comprises first and second pinions, said first pinion engaging a first rack provided on a fixed inclined surface, and said second pinion engages a second rack provided on said second movable bases.

5. The holder changer apparatus according to claim 1, further comprising a support means for providing additional support to said elevator means at said extended position.

6. The holder changer apparatus according to claim 1, wherein said press passes through a press work area during a pressing operation, and said elevator means extends within said press work area at said extended position.

7. The holder changer apparatus according to claim 1, further comprising control means for simultaneously controlling said robot means and said elevator means.

8. The holder changer apparatus according to claim 1, further comprising an interlock means provided between said robot means and said elevator means for preventing mutual interference thereof.

9. The holder changer apparatus according to claim 1, wherein said holder means comprise suction cups for gripping said raw works and said machined works.

* * * * *